United States Patent Office 3,444,806
Patented May 20, 1969

3,444,806
APPARATUS FOR PRESSING SCRAP
Saburoji Ozeki, Kenji Kimura, and Soichi Shimasaki, Tokyo, and Torao Izuhara, Osamu Kadota, and Kozi Sakurai, Yokohamashi, Japan, assignors to Nippon Kokan Kabushiki Kaisha, Tokyo, Japan
Filed July 6, 1967, Ser. No. 651,523
Claims priority, application Japan, July 9, 1966, 41/44,397
Int. Cl. B41f 5/02, 13/24, 3/20
U.S. Cl. 100—229    10 Claims

ABSTRACT OF THE DISCLOSURE

A scrap pressing apparatus in which scrap is compressed to form a body of scrap having a predetermined density suitable for subsequent operations on the body of scrap. The apparatus has a lower base means over which is situated a container which has an open top and in which is located the scrap which is to be compressed. An upper frame means is located over the base means while a mounting means mounts the upper frame means over the lower base means at a given elevation thereabove. A plurality of ram means are carried by the upper frame means, and a plurality of tamping means are respectively carried by the plurality of ram means to be reciprocated by the latter downwardly into and upwardly out of the container to compress the scrap therein into a scrap body of given density.

Background of the invention

The present invention relates to a scrap-pressing apparatus.

Thus, the present invention relates to an apparatus which is designed to compress scrap into a scrap body of a predetermined density.

For the purpose of melting scrap, such as scrap metal, in electrical melting installations, such as an electric furnace, for example, it is necessary to compress the scrap into a scrap body of a given density, and this body of scrap is then situated in the apparatus in which the melting of the scrap takes place.

At the present time conventional devices utilized for this purpose act on loose scrap situated in a container which has an open top. This container is usually embedded in the ground so that the compression forces will be absorbed by the ground. After the loose scrap is supplied into the container, as by being dropped into the latter from a suitable height, a weight is repeatedly dropped onto the scrap in the container so as to progressively compress the scrap. After these operations are completed, the compressed body of scrap is lifted and conveyed to a station where the further operations are performed thereon.

With conventional scrap-compressing apparatus of this type considerable undesirable vibrations are generated, and it is difficult to control the position of the weight which drops onto the scrap so that it is difficult to obtain a body of scrap which will have a predetermined density, which is to say a given specific gravity according to which a given volume of the body will be filled by a given amount of scrap. In addition, these conventional structures are dangerous because of the flying of the scrap upwardly in response to impact of the weight thereon, with the result that injury to property and personnel is not uncommon.

Summary of the invention

It is accordingly a primary object of the present invention to provide a scrap-pressing apparatus which will avoid the above drawbacks.

In particular, it is an object of the present invention to provide a scrap-pressing apparatus which is efficient and economical to operate and which at the same time is much safer than conventional apparatus as described above.

It is especially an object of the present invention to provide a scrap-pressing apparatus which is capable of forming the scrap into a body of predetermined density which will have the best possible characteristics for the subsequent operations which are to be performed on the body of the scrap.

Thus, it is an object of the present invention to provide an apparatus capable of compressing loose scrap into a body of scrap which will not only have a predetermined density but which will in addition have a configuration conforming to that of a furnace chamber into which the body of scrap is subsequently placed to be melted therein. Thus, the volume of the scrap body capable of being formed with the apparatus of the invention will conform to the volume of a furnace in which the body is subsequently placed to be melted therein, and in addition the specific gravity of the scrap body will be one which is most appropriate for melting purposes.

In accordance with the invention the apparatus includes a lower base means and an upper frame means situated thereover, a mounting means being provided for mounting the upper frame means at a given elevation over the lower base means. This base means supports, during the pressing operations, a container which has an open top and in which is located the scrap which is to be compressed. The upper frame means carries a plurality of ram means for reciprocating movement downwardly toward and upwardly away from the container, and the plurality of ram means respectively fixedly carry at their lower ends a plurality of tamping means which are displaced by the plurality of ram means, respectively, downwardly into the interior of the container to compress the scrap therein into a body of predetermined configuration and density. Thus, a partial pressing of the scrap can take place so as to form the scrap into a body having a given volume and configuration and a given specific gravity suitable for melting purposes and enabling this body of scrap to be formed even with scrap composed of irregularly shaped components.

Brief description of the drawings

The invention is illustrated by way of example in the accompanying drawings which form part of this application and in which.

Description of a preferred embodiment

Figure 1:
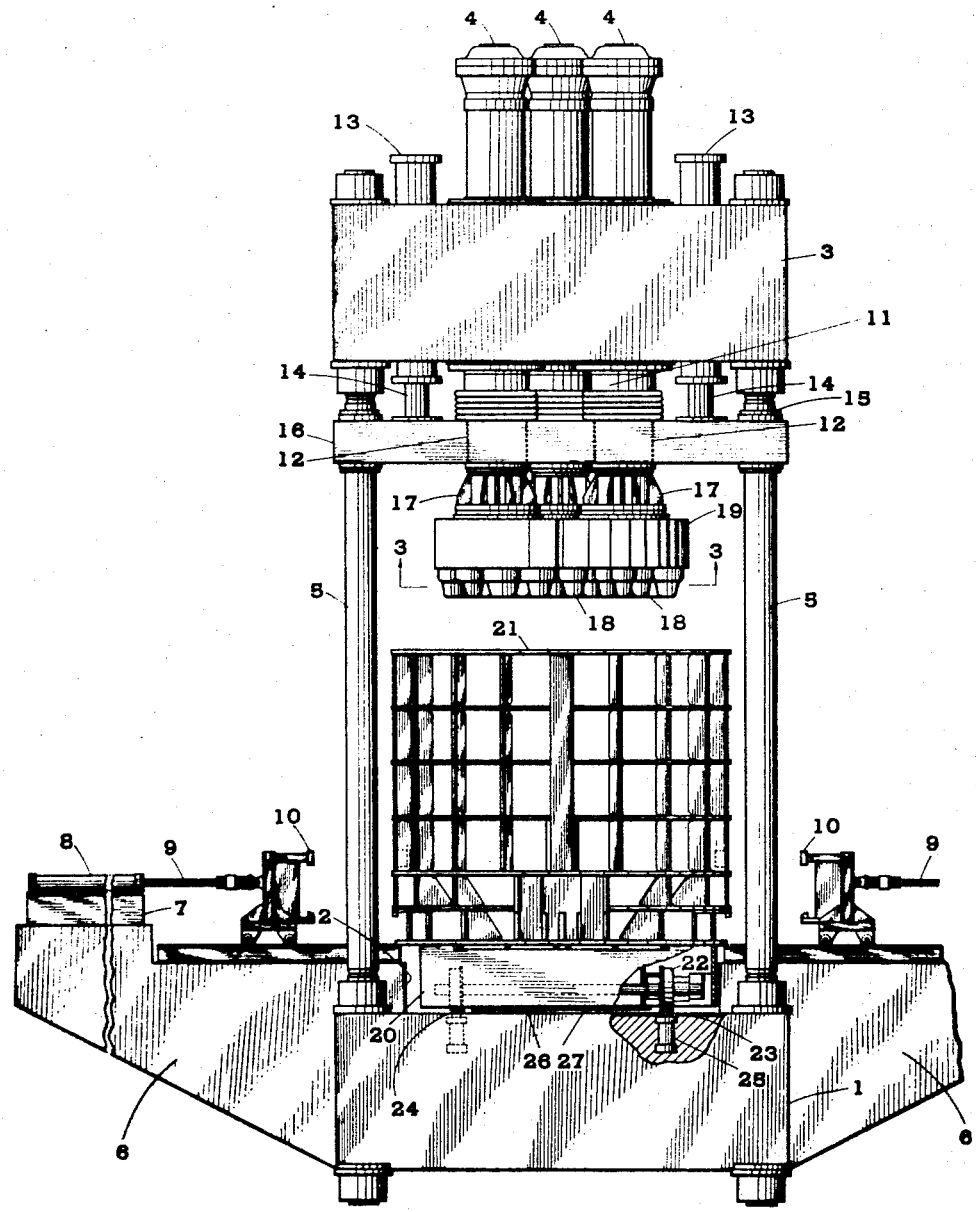
FIG. 1 is a side elevation schematically illustrating one possible embodiment of a scrap-pressing apparatus of the present invention.

Referring now to the drawings, there is shown in FIG. 1 a scrap-pressing apparatus of the invention which includes a robust lower base means 1 formed in its upper surface with a transverse notch or pit 2 which extends completely across and through the base means 1 and which has an upwardly directed surface 27, this notch 2 being of a generally rectangular configuration. An upper frame means 3, also of a robust construction capable of withstanding considerable force, is located over the base means 1 and has the substantially square configuration apparent from FIG. 2. The base means 1 has between front and rear extensions 6 thereof a substantially square configuration conforming to that of the frame means 3 and aligned therewith. At the corners of the lower base means 1 and the upper frame means 3 standards 5 are fixed, these standards or column being carried by and extending upwardly from the lower base means 1 and serving to carry the upper frame means 3, so that the columns 5 form a mounting means for mounting the frame means 3 at a given elevation over the lower base means 1.

A plurality of parallel elongated cylinders 4 and 13 are fixedly carried by and extend through the frame means 3 and have lower open ends, these cylinders being provided in any suitable way with fluid under pressure such as with a liquid under pressure so that hydraulic operation of the structure is provided in a manner described below. A plurality of ram means 11 are respectively slidable in the cylinders 4, so that in this way the ram means 11 are supported by the frame means 3 for reciprocating vertical movement, and a pair of additional plungers 14 are axially slideable within the hydraulic cylinders 13.

A guide means 16 is provided for guiding the plurality of ram means 11 during their axial movement, and this guide means 16 includes a crosshead formed with openings 12 through which the rams 11 respectively extend in slidable engagement with the crosshead 16 at the openings 12 thereof, and the cylinders 13 and plungers 14 form an adjusting means for adjusting the elevation of the guide means 16. This guide means 16 also has a square configuration conforming to that of and aligned with the upper frame means 3 and the lower base means 1, and at its corners the crosshead 16 is formed with openings through which the standards 5 slidably extend, so that in this way when the elevation of the guide means 16 is adjusted by the elevation-adjusting means 13, 14, the guide means 16 will itself be guided by the standards 5. At their bottom ends the rams 14 are fixed with head members 15 which in turn are fixed directly to the upper surface of the guide means 16 so that in this way the latter is rigidly connected with the plungers 14.

The several ram means 11 terminate beneath the guide means 16 in ram heads 17, respectively, which are respectively fixed to a plurality of tamping means which are thus carried by the plurality of ram means to be vertically displaced thereby. Each tamping means includes a tamping head 19 fixed to the head 17 of a ram 11 and a plurality of cylindrical tamping projections 18 in the form of cylindrical blocks fixed to and projecting downwardly from each tamping head 19.

Figure 3:
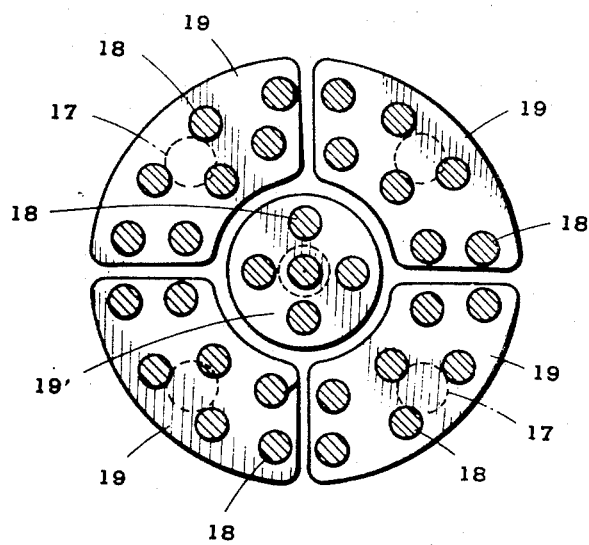
FIG. 3 is an upwardly directed sectional plan view taken along line 3—3 of FIG. 1 in the direction of the arrows and showing in particular the tamping means of the invention.

As is apparent from FIG. 3, in the illustrated example there is a central tamping head 19′ and a plurality of outer tamping heads 19 surrounding and located adjacent tamping head 19′ to have with the latter a total area of circular configuration as illustrated in FIG. 3. The tamping projections 18 carried by the central circular tamping head 19′ include a central tamping projection and a plurality of outer tamping projections 18 distributed along a circle about the central tamping projections, while the tamping projection 18, carried by the outer tamping heads 19 are arranged along additional circles, as indicated in FIG. 3. In the illustrated example the several outer tamping heads 19 are of an arcuate configuration and have their inner peripheries located adjacent central tamping head 19′ and their ends located adjacent each other. Thus, in the illustrated example there are five cylinders 4 and ram means 11 guided thereby, these cylinders 4 and ram means including a central cylinder and ram means and a plurality of outer cylinders and ram means distributed uniformly about the central cylinder and ram means. The outer ram means are respectively fixed to the outer tamping means while the central means is fixed to the central tamping means.

The upwardly directed surface 27 at the bottom of the notch 2 of the base means 1 is adapted directly to engage the lower surface 26 of a carriage means 20 which in turn carries a container 21 which has an open top and in which is located the scrap which is to be compressed, this container 21 resting directly on the carriage means 20. The interior of the container 21 is of a circular configuration conforming in cross sectional area to the area of the tamping heads 19 and 19′, so that when the latter are situated within the container the cross sectional area of the container will be substantially filled by the tamping means.

In order to reinforce the container 21 during the tamping operations, a fluid-pressure reinforcing means is provided, and for this purpose the extensions 6 of the base means 1 fixedly carry blocks 7 on which are respectively mounted hydraulic cylinders 8 which serve to slidably guide horizontally extending rams 9 which respectively terminate at their inner ends in heads 10 which engage exterior side surface portions, respectively, of the container 21 so as to press against the latter and reinforce it during the pressing operations.

The carriage means 20 is provided with wheels 22 capable of moving along a track means 23, 24 which includes at the base means 1 track portions 23 which are vertically displaceable by way of hydraulic jacks 25 suitably carried by the base means 1 and connected at their upper ends to the track portions 23. These track portions 23 are capable of being elevated by the jacks 25 to elevations where they are flush with and form continuations of the tracks 24 shown in FIG. 2, so that the carriage means 20 can be rolled along the track portions 24 onto the track portions 23 after which the latter can be lowered by the jacks 25 to place the lower surface 26 of the carriage means 20 directly in engagement with the surface 27 of the base means 1.

Figure 2:
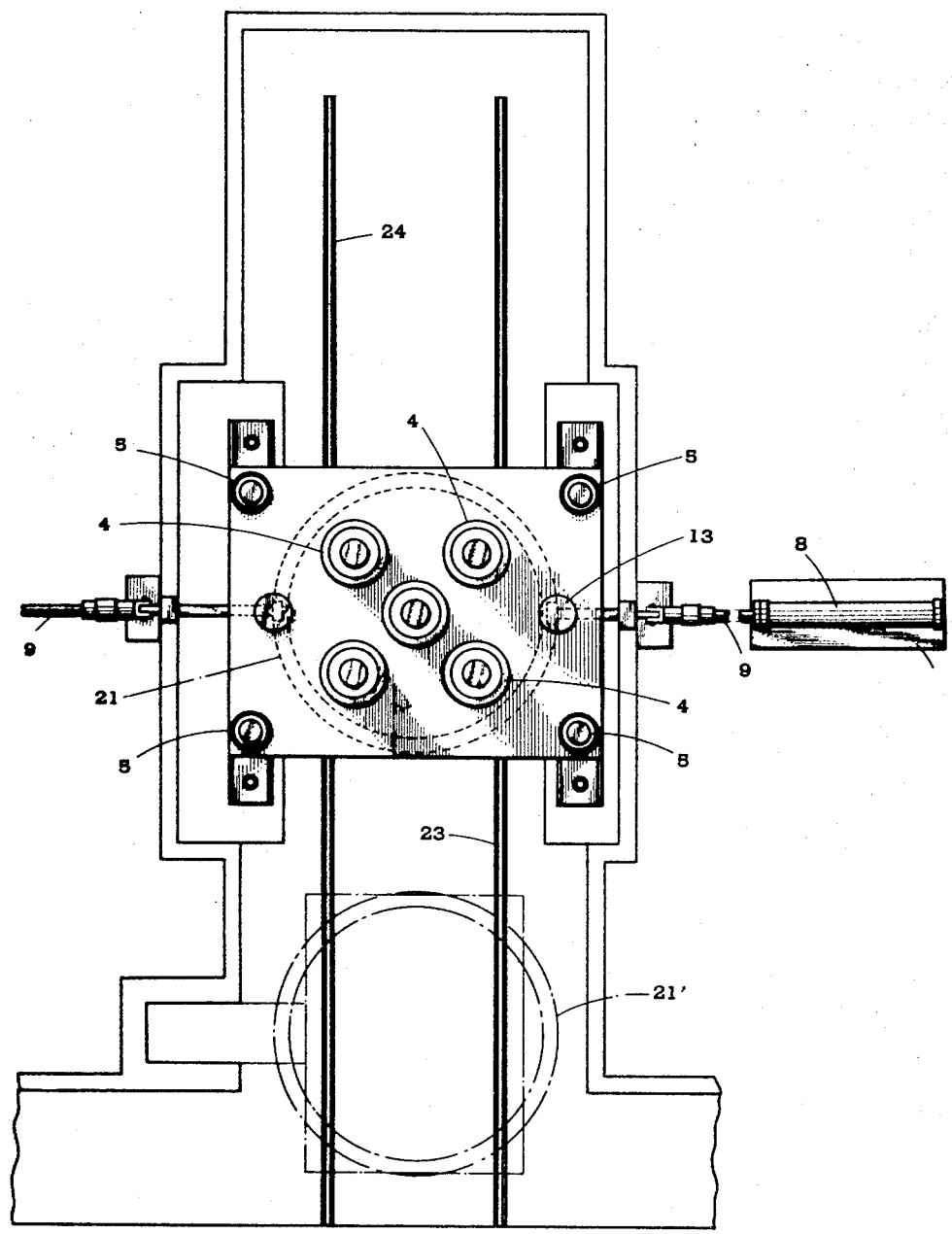
FIG. 2 is a fragmentary top plan view of the structure of FIG. 1 schematically illustrating the components thereof.

Thus, when the container 21 is at the position 21′ shown in dot-dash lines in FIG. 2, scrap may be supplied in any suitable way to the interior of the container 21 as by being dropped into the latter, and then the container 21 on the carriage means 20 is displaced along the track means 23, 24 into the notch 2 of the lower base means 1, whereupon the rail portions 23 are lowered by the jacks 25 so that the surface 26 directly engages the surface 27. Then the cylinders 8 are provided with hydraulic liquid under pressure, in any suitable way, so as to displace the rams 9 toward each other until the ram heads 10 press against the exterior side surface portions of the container 21.

Now fluid under pressure is supplied to the several cylinders 4, individually or simultaneously lowering the rams 11 through the guides 12 of the guide means 16 and causing the tamping means to enter into the container so that the tamping projections 18 will engage and compress the scrap within the container into a body of predetermined configuration. During these operations the elevation-adjusting means 13, 14 can be operated to lower the plungers 14 so as to situate the guide means 16 along the plurality of ram means 11 at a location where they will best be guided by the guide means 16. Thus, the plurality of ram means 11 may be vertically displaced so as to displace the plurality of tamping means and bring about compression of the scrap into a unitary scrap body whose configuration will be determined by the configuration of the interior of the container 21 and whose density can be precisely regulated so as to form a scrap body of a given size and configuration and of a given specific gravity.

When these operations are completed, the rams 9 are retracted and the rams 11 also are retracted while the guide means 16 is elevated by the adjusting means 13, 14, to the position shown in FIG. 1, and the jacks 25 are operated to raise the track portions 23 to the elevation of the track portions 24, after which the carriage means 20 can be rolled along the track portions 24 so as to situate the container 21 with the compressed scrapped body therein beyond the apparatus of the invention. This body is then raised by an appropriate hoisting device and is conveyed to a station where further operations are performed thereon.

The configuration of the interior of the container 21 is such that the scrap is formed into a block or body of scrap having a volume and configuration conforming to the volume and configuration of the furnace chamber, such as that of an electric furnace, in which the body of scrap is placed so as to be melted therein. The pressing operations can be carried out so that a partial pressing is performed to provide any desired density, and thus the specific gravity of the body of scrap will be regulated so as to be most suitable for melting, and this result is achieved in an economical manner irrespective of the type of scrap which is pressed.

As a result of using bodies of scrap formed with the apparatus of the invention, it is possible to perform operations such as electric melting in a highly efficient manner resulting in a considerable reduction in the amount of electrical energy required to melt the scrap.

What is claimed is:

1. In a scrap-pressing apparatus, lower base means for supporting a container situated over said base means and containing scrap which is to be pressed while the scrap is situated therein, said container having an open top, upper frame means situated over said lower base means, mounting means mounting said upper frame means at a given elevation above said lower base means, a plurality of ram means carried by said upper frame means over said lower base means for reciprocating movement downwardly toward and upwardly away from said lower base means, and a plurality of tamping means carried by said plurality of ram means, respectively, to be displaced thereby downwardly into the container for pressing scrap therein into a body of scrap wherein the scrap has a given density.

2. The combination of claim 1 and wherein said plurality of tamping means include upper tamping heads respectively fixed to lower ends of said plurality of ram means and together providing substantially a total area equal to and conforming in configuration to the cross-sectional configuration of the interior of the container, and a plurality of tamping projections fixed to and extending downwardly from each tamping head.

3. The combination of claim 2 and wherein said plurality of ram means include a central ram means and a plurality of outer ram means uniformly distributed about said central ram means, and said plurality of tamping heads including a central tamping head fixed to said central ram means and a plurality of additional tamping heads respectively fixed to said outer ram means and uniformly distributed about said central tamping head with said outer tamping heads respectively having ends located adjacent each other and inner peripheries located adjacent an outer periphery of said central tamping head.

4. The combination of claim 3 and wherein said container has an inner cross-sectional area of substantially circular configuration, said central tamping head being of circular configuration, and said outer tamping heads being of arcuate configuration, said tamping projections which are carried by said central tamping head including a central projection and a plurality of outer projections arranged along a circle surrounding said central projection, and said outer tamping heads carrying the projections which are fixed to and project therefrom at locations where the latter projections are arranged along a plurality of circles surrounding the circle along which said outer tamping members of said central tamping head are located.

5. The combination of claim 1 and wherein a guide means is situated between said upper frame means and lower base means for slidably guiding said plurality of ram means.

6. The combination of claim 5 and wherein an elevation-adjusting means is carried by said upper frame means and is connected with said guide mens for adjusting the elevation of the latter.

7. The combination of claim 1 and wherein a fluid-pressure reinforcing means is carried by said lower base means for releasably engaging said container to reinforce the latter during pressing of scrap therein.

8. The combination of claim 7 and wherein said reinforcing means includes horizontally directed rams which engage exterior side surface portions, respectively, of the container for laterally reinforcing the latter.

9. The combination of claim 1 and wherein a carriage means carries the container and is itself supported directly by said lower base means during compression of scrap in the container.

10. The combination of claim 9 and wherein a track means coacts with said carriage means for guiding the latter to and from an operative position located over said base means, said track means including at said base means vertically displaceable track portions, and jack means coacting with said vertically displaceable track portions for lowering the latter to place said carriage means directly in engagement with said base means and for raising the latter to elevate said carriage means away from said base means preparatory to moving the carriage means away from said base means.

References Cited

UNITED STATES PATENTS

| 3,130,469 | 4/1964 | Helmrich | 25—41 |
| 3,134,350 | 5/1964 | Danly et al. | |
| 3,323,447 | 6/1967 | Tezuka | 100—295 XR |
| 3,371,599 | 3/1968 | Tezuka | 100—237 XR |

BILLY J. WILHITE, *Primary Examiner.*

U.S. Cl. X.R.
100—237, 269, 295